US010916004B2

(12) United States Patent
Holloway et al.

(10) Patent No.: US 10,916,004 B2
(45) Date of Patent: Feb. 9, 2021

(54) AUTONOMOUS SURVEYING OF UNDERFLOOR VOIDS

(71) Applicant: Q-Bot Limited, London (GB)

(72) Inventors: Matthew Holloway, London (GB); Miguel Julia Cristobal, Munich (DE); Peter Childs, London (GB)

(73) Assignee: Q-Bot Limited, Greater London (GB)

( * ) Notice: Subject to any disclaimer, the term of this patent is extended or adjusted under 35 U.S.C. 154(b) by 147 days.

(21) Appl. No.: 16/311,801

(22) PCT Filed: Jun. 22, 2017

(86) PCT No.: PCT/EP2017/065362
§ 371 (c)(1),
(2) Date: Dec. 20, 2018

(87) PCT Pub. No.: WO2017/220716
PCT Pub. Date: Dec. 28, 2017

(65) Prior Publication Data
US 2019/0206046 A1    Jul. 4, 2019

(30) Foreign Application Priority Data

Jun. 22, 2016  (GB) .................................. 1610949.8
Mar. 31, 2017  (GB) .................................. 1705243.2

(51) Int. Cl.
*G06T 7/70*    (2017.01)
*G06T 7/00*    (2017.01)
(Continued)

(52) U.S. Cl.
CPC .............. *G06T 7/0004* (2013.01); *G01C 3/08* (2013.01); *G06T 7/521* (2017.01); *G06T 7/579* (2017.01);
(Continued)

(58) Field of Classification Search
CPC ....... G06T 7/0004; G06T 7/579; G06T 7/521; G06T 2207/10016; G06T 2207/10028;
(Continued)

(56) References Cited

U.S. PATENT DOCUMENTS 8,363,905 B2 *   1/2013   Owens, Jr. ............... G06K 9/48
                                                     382/110
8,855,819 B2 *  10/2014   Choi ....................... B25J 9/1692
                                                     700/251
(Continued)

FOREIGN PATENT DOCUMENTS

GB          2514405 A     11/2014
GB          2514405 A1    11/2014
(Continued)

OTHER PUBLICATIONS

Alismail, Hatem, "Automatic Calibration of Spinning Actuated Lidar Internal Parameters," pp. 1-22.
(Continued)

*Primary Examiner* — Gregory M Desire
(74) *Attorney, Agent, or Firm* — Seyfarth Shaw LLP

(57) ABSTRACT

The present disclosure provides a method of processing depth data and image data from a robotic device having a camera and a depth measurement device mounted to a chassis of the robotic device to generate a data set representative of a three-dimensional map of an environment in which the robotic device is located. The camera is arranged to generate image data relating to the environment. The depth measurement device is arranged to generate depth data relating to the environment. The method comprises generating image data and depth data at a first location of the robotic device in the environment, whereby to generate a first data set comprising a plurality of data points. The method further comprises moving the robotic device to at least a second location in the environment. The method (Continued)

further comprises generating image data and depth data at the second location, whereby to generate a second data set comprising a plurality of data points. The method further comprises associating each data point of the first data set with the spatially nearest point of the second data set, if any, within a predefined distance from the first data point. The method further comprises replacing data points from the first data set with the associated data points from the second data set by reference to the distance of the data point from the location of the robotic device when the data point was generated.

15 Claims, 11 Drawing Sheets

(51) Int. Cl.
G06T 7/579 (2017.01)
G06T 7/521 (2017.01)
G01C 3/08 (2006.01)

(52) U.S. Cl.
CPC .............. G06T 2207/10016 (2013.01); G06T 2207/10028 (2013.01); G06T 2207/30108 (2013.01); G06T 2207/30244 (2013.01)

(58) Field of Classification Search
CPC ........... G06T 2207/30108; G06T 2207/30244; G01C 3/08
See application file for complete search history.

(56) References Cited

U.S. PATENT DOCUMENTS

| 8,903,161 | B2* | 12/2014 | Kwak | G06T 7/73 |
| | | | | 382/153 |
| 9,037,396 | B2* | 5/2015 | Pack | G01C 21/30 |
| | | | | 701/409 |
| 9,463,574 | B2* | 10/2016 | Purkayastha | G05D 1/0088 |
| 9,632,504 | B1* | 4/2017 | Watts | G05D 1/0231 |
| 2009/0063105 | A1 | 3/2009 | Chang et al. | |
| 2014/0081459 | A1* | 3/2014 | Dubois | B25J 9/1697 |
| | | | | 700/259 |
| 2014/0267703 | A1* | 9/2014 | Taylor | G06T 7/73 |
| | | | | 348/139 |
| 2015/0339541 | A1 | 11/2015 | Fan et al. | |
| 2016/0167226 | A1* | 6/2016 | Schnittman | G05D 1/0274 |
| | | | | 382/153 |
| 2016/0257000 | A1* | 9/2016 | Guerin | B25J 9/1605 |
| 2019/0206046 | A1* | 7/2019 | Holloway | G06T 7/0004 |

FOREIGN PATENT DOCUMENTS

| GB | 2526342 A | 11/2015 |
| GB | 2526342 A1 | 11/2015 |

OTHER PUBLICATIONS

Combined Search and Examination Report for Application No. GB1705243.2 dated May 24, 2017, 8 pages.
International Search Report for Application No. PCT/EP2017/065362 dated Aug. 7, 2017, 30 pages.
Miquel Julia et al. "Autonomous Surveying of Underfloor Voids," Proceedings of ISR 2016: 47st International Symposium on Robotics, Munich, Germany, Jun. 21, 2016,-Jun. 22, 2016, pp. 244-250.
Keller Maik et al. "Real-Time 3D Reconstruction in Dynamic Scenes Using Point-Based Fusion," 2013 International Conference on 3D Vision, IEEE, Jun. 29, 2013, pp. 1-8.
Thibaut Weise et al. "In-Hand scanning with online loop closure," 2009 IEEE 12th International Conference on Computer Vision Workshops, ICCV Workshops: Kyoto, Japan, Sep. 27-Oct. 4, 2009, Institute of Electrical and Electronics Engineers, Piscataway, NJ, Sep. 27, 2009, pp. 1630-1637.
Miguel Julia, et al. "Autonomous Surveying of Underfloor Voids," ISR (Jun. 21-22, 2016), pp. 244-250, Munich, Germany.
Weise Thibaut, et al, "In-hand Scanning with Online Loop Closure," IEEE 12th International Conference on Computer Vision Workshops, ICCV Workshops, 2009, pp. 1630-1637.
Keller Maik, et al, "Real-time 3D Reconstruction in Dynamic Scenes using Point-based Fusion," International Conference on 3D Vision, 2013, pp. 1-8.
Newcombe, Richard A. et al, "KinectFusion: Real-Time Dense Surface Mapping and Tracking," Oct. 28, 2011, 66 pages, Imperial College, London, Microsoft Research, Cambridge.
Kok-Lim Low, "Linear Least-Squares Optimization for Point-to-Plane ICP Surface Registration," Technical Report TR04-004, Feb. 2004, Department of Computer Science, University of North Carolina at Chapel Hill.
Makarenko, Alexei, et al, "An Experiment in Integrated Exploration," IEEE/RSJ International Conference on Intelligent Robots and Systems, 2002, pp. 534-539, vol. 1.
Kohlbrecher, Stefan, et al, "A Flexible and Scalable SLAM System with Full 3D Motion Estimation," 2011 IEEE International Symposium on Safety, Security, and Rescue Robotics (SSRR), Nov. 1-5, 2011, pp. 155-166, Technische Universitat Darnstadt Hochschulstrabe 10, Darmstadt, Germany.
Simmons, Reid, et al, "Coordination for Multi-Robot Exploration and Mapping," in Proceedings of the AAAI National Conference on Artificial Intelligence, 2000, Austin, Texas.
Miguel Julia, et al, "A Comparison of Path Planning Strategies for Autonomous Exploration and Mapping of Unknown Environments," Autonomous Robots, Jun. 22, 2012, pp. 427-444, vol. 33.4.
Besl, Paul, et al, "A Method for Registration of 3-D Shapes," IEEE Transactions on Pattern Analysis and Machine Intelligence(PAMI), Feb. 1992, pp. 239-256, vol. 14, No. 2.
Yamauchi, Brian, "A Frontier-Based Approach for Autonomous Exploration," in proceedings of the IEEE International Symposium on Computational Intelligence in Robotics and Automation, 1997, Monterey, California.
Zlot Robert, Anthony, et al., "Multi-Robot Exploration Controlled by a Market Economy," in Proceedings of the IEEE International Conference on Robotics and Automation, 2002, Washington D.C.
Fitzgibbon, Andrew W., "Robust Registration of 2D and 3D Point Sets," British Machine Vision Conference (BMVC), 2001, pp. 411-420.
Grisetti, Giorgio, et al. "Non-linear Constraint Network Optimization for Efficient Map Learning," IEEE Transactions on Intelligent Transportation Systems, 2009, pp. 428-439, vol. 10, Issue 3.
Gonzalez-Banos, Hector et al., "Navigation Strategies for Exploring Indoor Environments," the International Journal of Robotics, 2003, pp. 829-848, vol. 21.
Marder-Eppstein, Eitan, et al., "The Office Marathon: Robust Navigation in an Indoor Office Environment," IEEE International Conference on Robotics and Automation (IRCA), 2010.
Quigley, Morgan, et al., "ROS: an Open-Source Robot Operating System " Proc. Open-Source Software Workshop of the International Conference on Robotics and Automation (IRCA), 2009.
Arun, K.S., et al., "Least-Squares Fittings of Two 3-D Point Sets," IEEE Transactions on Pattern Analysis and Machine Intelligence, Sep. 1987, pp. 698-700, vol. Pami-9, No. 5.
Whelan, Thomas, et al., "ElasticFusion: Dense SLAM Without a Pose Graph," Proceedings of Robotics: Science and Systems, 2015.
Stachniss, Cyrill, et al., "Information Gain-based Exploration Using Rao-Blackwellized Particle Filters," Proceedings of the IEEE-RSJ International Conference on Intelligent (RSS '05), 2005, Cambridge, MA.
Holz, Dirk, "Registration with the Point Cloud Library a Modular Framework for Aligning in 3-D," IEEE Robotics & Automation Magazine, Dec. 2015, pp. 110-124, vol. 22, Issue 4.
Andreasson, Henrik, et al., "6D Scan Registration using Depth-Interpolated Local Image Features," Centre for Applied Autonomous Sensor Systems, Dept. of Technology, Orebro University, Orebro, Sweden.

(56) References Cited

OTHER PUBLICATIONS

Wurm, Kai M., et al., "Coordinated Multi-Robot Exploration using a Segmentation of the Environment," in Proceedings of the IEEE-RSJ International Conference on Intelligent Robots and Systems, 2008, France.

Combined Search and Examination Report for United Kingdom Application No. GB17052412, dated May 24, 2017, 8 pages.

\* cited by examiner

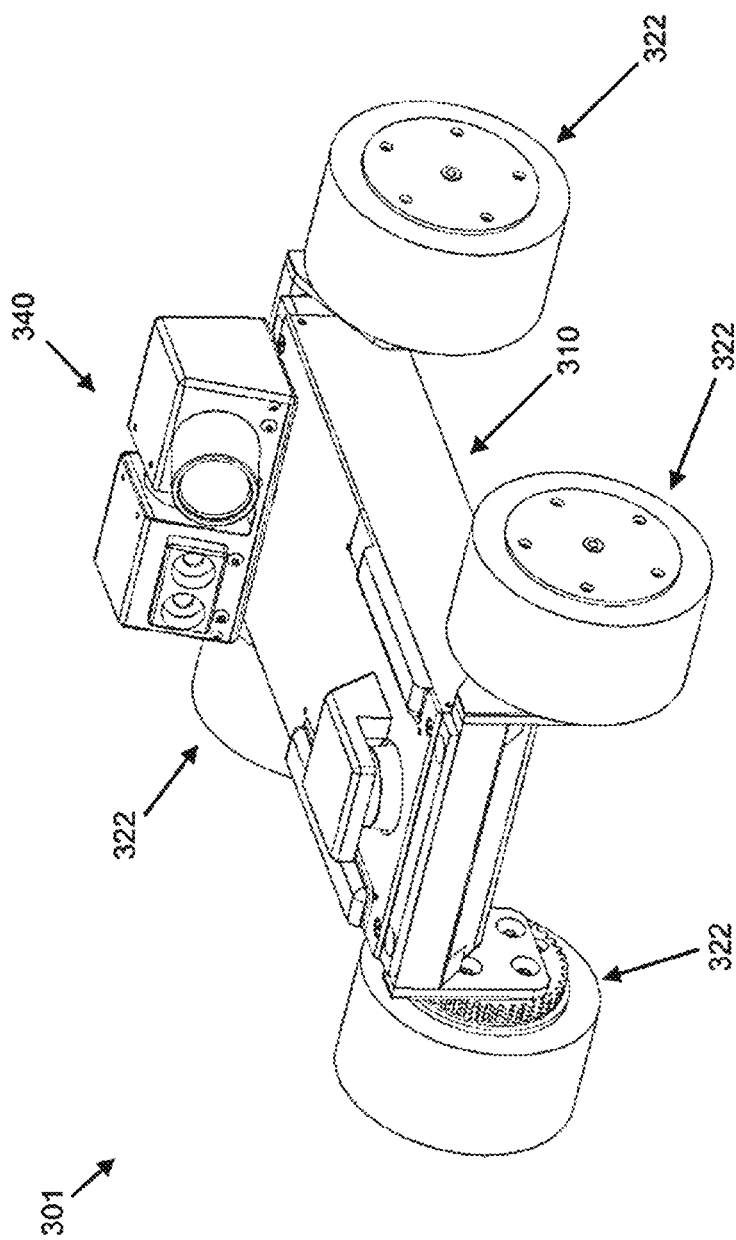

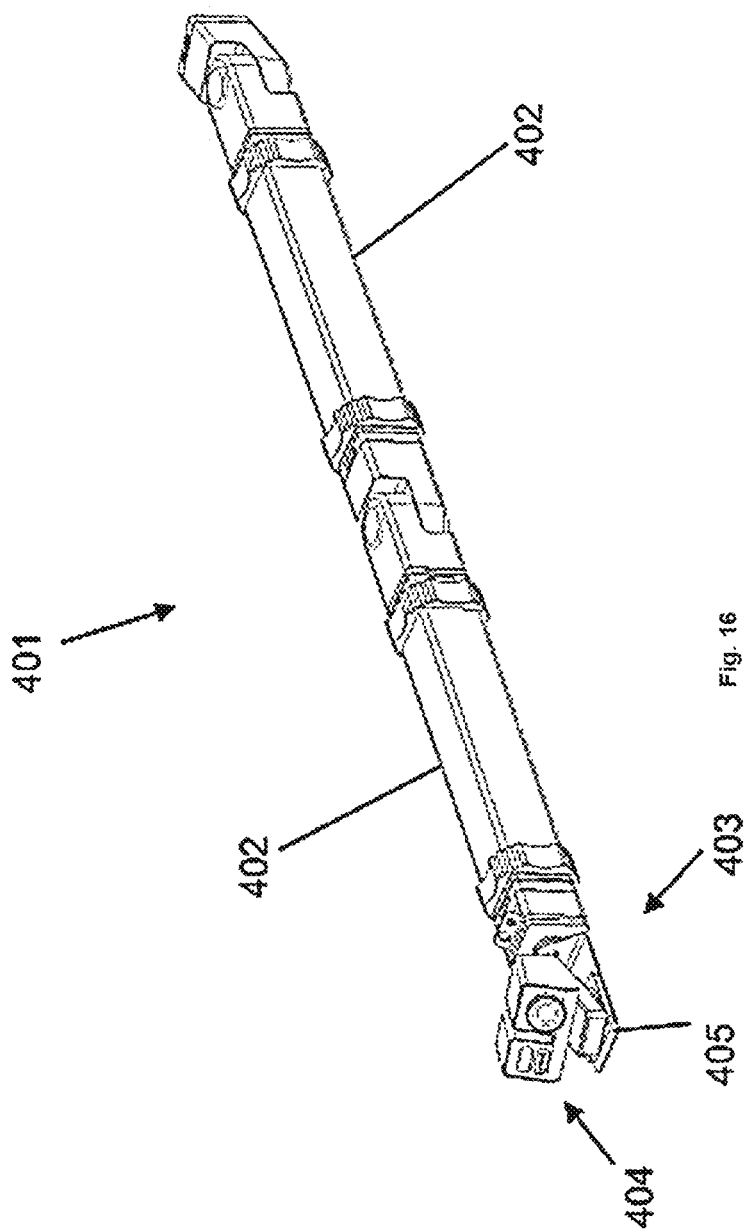

AUTONOMOUS SURVEYING OF UNDERFLOOR VOIDS

CROSS REFERENCE TO RELATED APPLICATIONS

This is a National Stage application of, and claims priority to, PCT/EP2017/065362, filed Jun. 22, 2017, which claims priority to GB Patent Application No. 1610949.8, filed Jun. 22, 2016 and GB Patent Application No. 1705243.2, filed Mar. 31, 2017, the disclosures of which are incorporated herein by reference in their entirety.

This disclosure relates to methods and robotic devices for the autonomous surveying of underfloor voids and the like.

BACKGROUND

Autonomous exploration [5] and surveying of an underfloor void or crawl space is a challenge for mobile robots, but one for where there are many applications such as mapping and inspecting services e.g. looking for leaking pipes, damaged insulation or faulty wiring; checking for hazards e.g. surveying for the presence of asbestos.

Crawl spaces and under floor voids provide many problems not encountered in other applications where autonomous exploration and surveying is more common. This includes operating in confined spaces with irregular 3D paths, restricted openings, unknown obstacles, rough terrain, rubble, sand and mud. There are also difficulties for vision systems including dust, poor and inconsistent illumination, shadows and occlusions.

Due to the nature of these environments umbilical cords that can get caught on obstacles are not desirable, while wireless communications have limited range. Therefore it is highly desirable to create robots that can operate autonomously without relying on operator input.

The exploration problem [5] can be defined as the process of autonomously mapping an unknown area. This is usually done by repeatedly selecting the best destination from a subset of candidates according to some criteria such as the shortest travelling distance [12], or a combination of the travelling cost with information gain [2]. The set of candidate destinations used to consist of the frontiers between the explored and the unexplored areas. This is known as frontier-based exploration.

In addition, many authors have focussed in the coordination of multiple robots to explore the environment faster. In this sense, different ways of coordinating the robots, by means of selecting destinations for each robot based on utility functions that measure the trade of between cost and information gain, have been proposed [11] [14]. Furthermore, some authors have studied how the structure of the environment can be used in order to improve the coordination [15].

Other authors have centred their attention on how the planned trajectories are related to the mapping process. In this sense, different trajectories can positively or negatively affect the localization and therefore the accuracy of the created maps [13]. The exploration methods that take into account the relation of the path planning with the simultaneous localization and mapping are normally called integrated exploration approaches [8].

Most of these exploration techniques work with a 2D occupancy grid map built from laser or sonar readings. However, with the appearance of new sensors techniques for 3D dense depth perception such as dense stereo camera systems, RGB-D (red-green-blue-depth) cameras, or 3D laser scanners, in the recent years, there has been an increased interest in 3D mapping with mobile robots. In this sense, many authors have focussed in developing techniques for quickly registering 3D depth data and built global 3D models. In this sense, the iterative closest point algorithm (ICP) [20] and variants of it [4] have become a quite common choice for registering the data and it has been integrated in many mapping systems with depth sensors using different map representations as, for instance, volumetric distance functions [19] or surfel-based representations [9]. ICP is used for finding the alignment between two datasets. In this sense, it can be used in order to find the alignment between new data and a global model for a subsequent update of that global model in an incremental way, or it can be used in order to align multiple datasets, thus creating a pose graph that can be later optimized [3].

BRIEF SUMMARY OF THE DISCLOSURE

According to an invention disclosed herein there is provided a method of processing depth data and image data from a robotic device having a camera and a laser rangefinder (or other suitable depth measuring device) mounted to a chassis of the robotic device, the camera being arranged to generate image data relating to an environment in which the robotic device is located and the laser rangefinder being arranged to generate depth data relating to the environment.

The laser rangefinder may be arranged to generate depth data relating to a forward direction and to a rearward direction. The laser rangefinder may be arranged to rotate about an axis substantially perpendicular to the forward direction and the rearward direction. The method may comprise calibrating the depth data by comparison of depth data measured in the forward direction to depth data measured in the rearward direction, the depth data relating to corresponding points in the environment.

The image data from the camera may be calibrated by reference to image data relating to a predefined target located within the environment.

The method may comprise generating image data and depth data at a first location of the robotic device in the environment, moving the robotic device to at least a second location in the environment, generating image data and depth data at the second location, and combining the image data and depth data generated at the first and second locations. The robotic device may be configured to move autonomously from the first location to the second location. The robotic device may be configured to calculate the position of the second location. The second location may be calculated by selecting a second location from a plurality of candidate locations by reference to the expected increase in information relating to the environment achievable at each candidate location. The second location may be calculated by selecting a second location from a plurality of candidate locations by reference to the distance of each candidate location from the first location. In one embodiment, the second location is calculated by reference to the expected increase in information in combination with the distance to each candidate location.

The second location may be calculated by selecting a second location from a plurality of candidate locations by reference to the expected correlation between depth data and/or image data obtainable at each candidate location and the depth data and/or image data already obtained at at least one previous first location. In this way, the second location can be selected in a manner which simplifies the fusion of the depth and/or image data obtained at the second location with previously-obtained data.

The method may comprise combining depth data and/or image data obtained at different locations and/or orientations ("poses") of the camera and/or laser rangefinder. A first data set relating to at least a first pose may comprise a plurality of points. A perimeter, for example defined by a radius, may be associated with each point in the first data set. A second data set relating to a second pose may comprise a further plurality of points. A perimeter, for example defined by a radius, may be associated with each point in the second data set. Each point of the first data set may be associated with the nearest point of the second data within its perimeter. A resultant data set may be generated by adding to the points of the first data set those points in the second data which have not been associated with points in the first data set. In the resultant data set, points from the first data set may be exchanged with their associated points from the second data set if the perimeter of the point in the first data set is larger than the perimeter of the associated point in the second data set. The size of the perimeter may be calculated by reference to the distance of the point from the camera and/or laser rangefinder when the depth and/or image data associated with the point was generated. Thus, data that was generated when the camera/rangefinder was close to the relevant point is selected for inclusion in the resultant data set in preference to data that was generated when the camera/rangefinder was further from the relevant point.

According to an invention disclosed herein there is provided a robotic device comprising a chassis, a sensor turret mounted to the chassis for rotation relative thereto about a rotational axis, and a camera and a laser rangefinder mounted to the sensor turret for rotation therewith about the rotational axis. The laser rangefinder is configured to generate depth information by scanning in a plane substantially parallel to the rotational axis, and the relative position of the camera and the laser rangefinder on the turret is fixed, whereby to maintain a spatial correlation between the depth information from the laser rangefinder and image data generated by the camera.

In this way, the mechanical configuration of the sensor turret ensures the continued correlation of the depth information and the image data.

Typically, the rotational axis of the sensor turret is substantially perpendicular to a plane of the chassis, for example a substantially vertical axis.

The robotic device may further comprise at least one light for illuminating a field of view of the camera. The light(s) may be mounted to the chassis. In one embodiment, the light is mounted to the sensor turret for rotation therewith about the rotational axis. In this way, illumination of the field of view of the camera is ensured.

The camera may be a video camera. The camera may be a thermal camera. The robotic device may further comprise a tilt sensor (inertial measurement unit). The robotic device may further comprise a further laser rangefinder configured to generate depth information by scanning in a plane substantially perpendicular to the rotational axis.

The robotic device may be battery powered. The robotic device may be a robotic vehicle, for example comprising at least two driven wheels or tracks. Alternatively, the robotic device may be provided, for example, on a motorised arm.

According to an invention disclosed herein there is provided a controller for a robotic device, the robotic device comprising a chassis, a spray gun for spraying material onto a surface, a camera, a laser rangefinder and a data communication module in data communication with the spray gun, the camera and the laser rangefinder. The controller is configured for data communication with the data communication module, whereby to receive data from the spray gun, the camera and the laser rangefinder, and to generate a representation on an operator display of a current spray pattern for the spray gun based on the received data.

The controller may be configured automatically to generate control data for the spray gun in response to input from an operator in combination with received data from the spray gun, the rangefinder and a tilt sensor mounted to the robotic device, in order to generate a spray pattern requested by the operator.

The invention extends to a general purpose computer, such as a laptop computer, programmed to operate as the controller and to computer software which programmes a general purpose computer to operate as the controller.

The vehicle may comprise a spray gun mounted to the chassis. The spray gun may be provided with one or more hose connections for providing the material(s) to be sprayed. The spray gun may be mounted for rotation about one or more, for example at least two, axes relative to the chassis.

The robotic vehicle may comprise a camera, for example a video camera, mounted to the chassis. In embodiments of the invention, the camera may be a thermal camera. The camera may be mounted for rotation relative to the chassis, for example about one or more axes. Lights may be provided to illuminate the view of the camera. The lights may be arranged for rotational movement with the camera, for example mounted to a camera turret.

The robotic vehicle may comprise one or more laser rangefinders mounted for rotation with the camera. The provision of a laser rangefinder enhances the information available to an operator of the robotic vehicle.

BRIEF DESCRIPTION OF THE DRAWINGS

Embodiments of the invention are further described hereinafter with reference to the accompanying drawings, in which:

FIG. 15 is an illustration of an embodiment of a robotic vehicle according to the present disclosure; and FIG. 16 is an illustration of an embodiment of a robotic device according to the present disclosure.

DETAILED DESCRIPTION

In this application, a novel robotic system that solves the problem of autonomous mapping an underfloor void is presented. The approach is based on a 3D laser scanner. A real time navigation system and a new high level planner that selects the next best scanning position control the motion of the robot. Multiple scans are aligned using ICP (iterative closest point) and graph optimization techniques. Finally, a point cloud fusion algorithm creates a global model of the environment from the aligned scans.

The first contribution of this application consists of the development and integration of a robotic system that solves this problem by combining a 3D scanner system, ICP-based alignment and 3D model reconstruction with a real time navigation system that includes an autonomous survey planning system that intelligently selects the next best scanning position. In this regard, the second contribution is the extension of the traditional 2D exploration next-best-view algorithm [2] to 3D models. Our approach considers travelling costs and information gain and it also includes a localizability term in order to facilitate the alignments.

The underfloor void case scenario presents many challenges from the exploration point of view. While the scenario can vary significantly from one real-case site to another, in general, the confined spaces does not suit well a multi-robot system for a fast coordinated exploration. In addition, the relevant features of the environment, e.g. insulation, pipes or other services, jointly with structural features like joists or walls require a 3D mapping system. This makes necessary a different exploration approach than the traditional 2D map based exploration methods. Furthermore, the robot has to move in an irregular surface that makes real-time localization difficult and operate in a poorly illuminated confined space that makes vision systems more complex. In this sense, depth cameras used to have a limited depth range and a narrow field of view. Therefore, they are not the best choice for operating in a confined space with poor illumination. Consequently, given the difficulties for registering the data in these conditions, it was decided to base the approach in a 3D textured laser scanner in order to gather a large amount of data from a small set of scanning positions.

Figure 1:
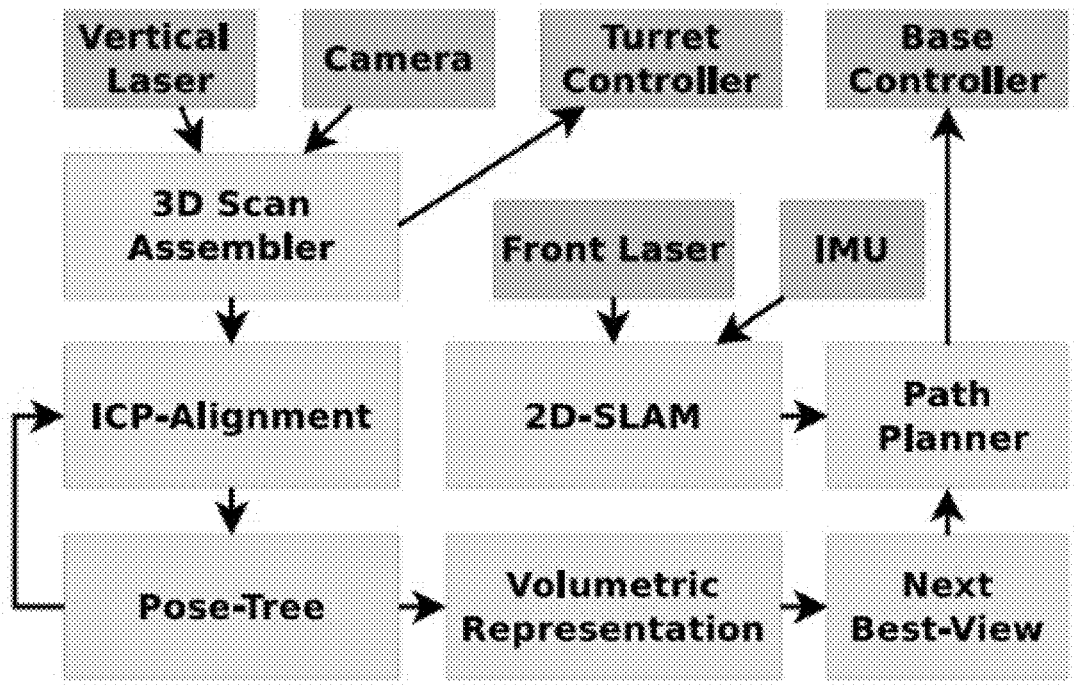
FIG. 1 illustrates the architecture of the proposed real time system
Figure 2:
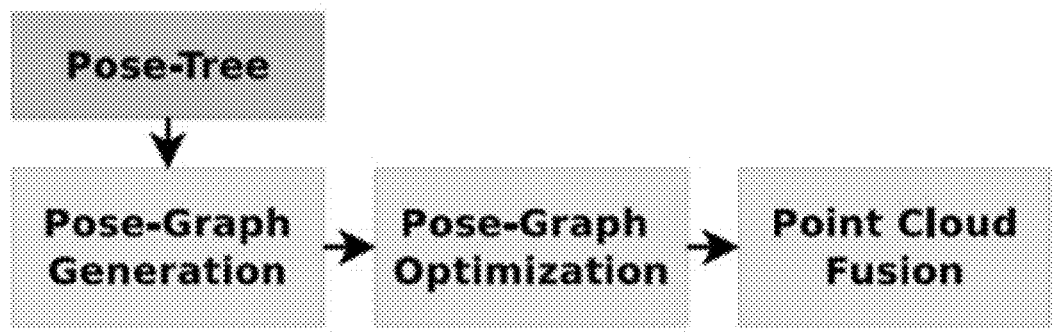
FIG. 2 illustrates the post-processing procedure

In this way, the 3D exploration problem is reduced to capturing and aligning multiple scans and fusing them into a global model. The proposed architecture is illustrated in FIG. 1. The 3D scanner consists of a camera and a vertically mounted laser on top of a rotating turret. The depth and colour data from these two sensors are collected as the turret rotates and assembled into a 3D textured point cloud. This system and its calibration is described in Section 4.1. The multiple scans are sequentially aligned in a pose-tree using ICP. A low resolution volumetric representation is updated after each new aligned scan. This SLAM (simultaneous localisation and mapping) system will be explained in Section 4.2. However, it only evaluates the localization of the robot for places where a scan is performed. In this sense, a 2D SLAM system runs in parallel and is used for navigating between the scanning poses as presented in Section 4.3. In addition, a new 3D exploration method is introduced in Section 4.4 for selecting the next best scanning position using the volumetric representation. Finally, as illustrated by FIG. 2, a post-processing stage takes place that optimizes the alignment of multiple scans in a graph and fuses the data in a global is summarized in Section 4.5.

4 System Description 4.1 Robot Architecture

Figure 3:
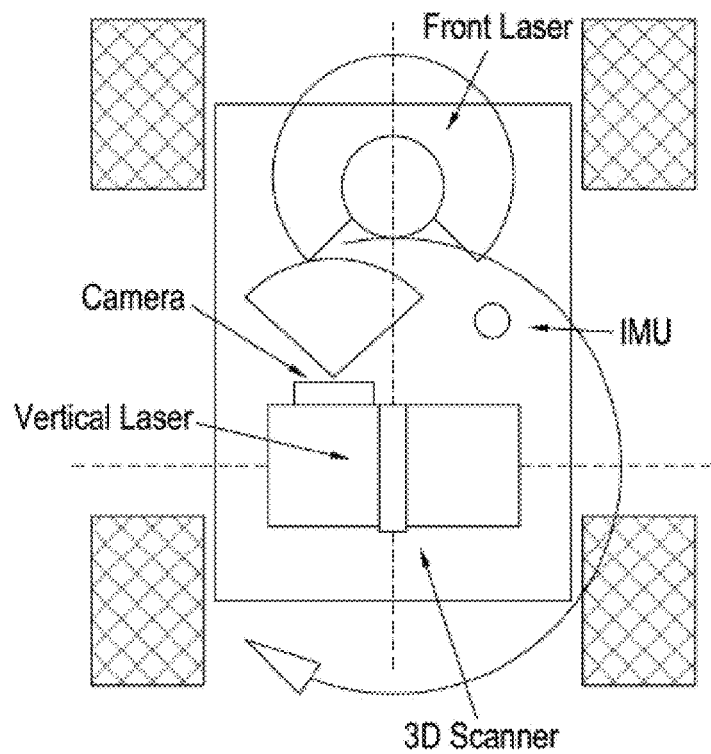
FIG. 3 illustrates a diagram of the robot and sensors placement

The designed surveying robot consists of a small four-wheeled robotic platform with a front horizontal laser, an IMU (inertial measurement unit) and an actuated camera-laser system (3D scanner). FIG. 3 shows a diagram of the robot and the sensors placement. The ROS (Robot Operating System) framework [10] is used over a distributed system between an on-board computer and an external operator station.

4.1.1 3D Scanning System

The 3D scanner consists of an actuated camera-laser system. The laser scans a vertical plane that turns as the turret rotates. The camera is used in order to add colour data to the depth measurements of the laser.

In this sense, the laser provides a set of distance readings $\rho_i$ at different angles $\theta_i$. These readings can be expressed as 3D points in the laser frame of reference $p_i^{[l]} \in \mathbb{R}^3 = [\theta_i \cos \theta_i \, \rho_i \sin \theta_i \, 0]^T$. This is translated to the fixed frame by:

$$P_{i,j}^{[f]} = R_x(\phi_j) T_{laser} P_{i,j}^{[l]} \quad (1)$$

where $T_{laser} \in \mathbb{SE}_3$ is the calibrated position of the laser in the moving 3D scanner frame of reference and $R(\phi_j) \in \mathbb{SO}_3$ is the corresponding rotation of the actuator of an angle $\phi_j$. Note that, for simplicity of notation, the conversion between 3-vectors and the corresponding homogeneous 4-vectors (needed for multiplication with $T_{laser}$) has been omitted.

Equation (1) is used in order to project every point acquired during a 360 degrees turn into the fixed 3D scanner frame of reference, thus generating a point cloud. Finally, the colour of the corresponding pixels in the images are associated with each point by:

$$c_{\{i,j\},k} = I_k(\pi(K T_{cam} R_x(-\phi_k) P_{i,j}^{[f]})) \quad (2)$$

where $R(-\phi_k) \in \mathbb{SO}_3$ is the rotation matrix corresponding to the actuator at the angle $\phi_k$ at which the image was acquired, $T_{cam} \in \mathbb{SE}_3$ is the transformation corresponding to the calibrated camera pose in the 3D scanner moving frame, $K$ is the calibrated camera matrix, $u=\pi(x)$ is a function that performs the dehomogenisation of $x \in \mathbb{R}^3 = (x, y, z)$ in order to obtain $u \in \Omega = (x/z, y/z)$, and $I_k: \Omega \to \mathbb{N}^3$ is the subpixel mapping between the image space domain $\Omega \subset \mathbb{R}^2$ and the colour values corresponding to the rectified image k.

4.1.2 3D Scanner Calibration

In order to calibrate the pose of the laser in the moving frame $T_{laser} \in \mathbb{SE}_3$, it is necessary to split the vertical laser points into two parts (front and rear) as shown in [21]. Then the laser pose can be calibrated by minimizing the error between corresponding points of the front and the rear parts of the scan after a 360 degrees movement of the turret. Thus the scene is completely covered with each part of the scan. In this sense, gradient descent is applied in order to minimize the error:

$$E_{laser}(T_{laser}) = \sum_{m=1}^{M} \left\| p_m^{[f]} - p_{m'}^{[f]} \right\|^2 \quad (3)$$

where $p_m^{[f]}$ is the nearest point in data from the rear part of the scan to the point $p_m^{[f]}$ from the front part of the scan expressed in the fixed frame of reference. In this case, the gradient is estimated numerically.

Similarly, the camera pose $T_{cam} \in \mathbb{SE}_3 = [R_c \, t_c]$ needs to be also calibrated. To achieve this, a planar chessboard pattern of known dimensions is 3D scanned at multiple locations. In addition, an image is captured from each location with the turret positioned at the zero angle ($\phi$=0). The equation of the plane containing the pattern can be easily obtained for each pair of 3D laser scan (referred to the fixed frame) and image (in the camera frame). While typical methods from intrinsic camera parameters calibration can be used for detecting the chessboard in the image, RANSAC (random sample consensus) can be applied for plane fitting to the laser scan. The normals of these planes are arranged as two matrices $N_L$, $N_c$, one for the laser in the fixed frame and one for the camera in the camera frame. Then, the covariance H=cov($N_L$, $N_C$) between these two matrices can be decomposed H=USV' using SVD (singular value decomposition) in order to obtain the rotation part of the camera transform $R_c$VU' in a similar way to [1]. In order to find the translation, it is necessary to pair corresponding points between the laser and camera data. A possible choice, that can be extracted directly from the plane equations, is the pair or solutions corresponding to the least squares problems $N_c X_c + D_c = 0$ and $N_L X_L + D_L = 0$, where $D_c$ and $D_L$ are column vectors of the independent terms in the plane equations. Then, the camera translation is $t_C = R_C X_L - X_C$.

4.2 ICP-SLAM

Different point clouds are aligned using the Iterative Closest Point Algorithm (ICP) [4]. In this case, the goal of ICP is to find the transformation $T \in SE_3$ that minimizes the point to plane error function:

$$E(T) = \sum_{m=1}^{M} ((T p_m - p'_m) \cdot n_{p_m})^2 \quad (4)$$

where $p_m$ and $p'_m$ are corresponding pairs of points between two point clouds obtained by nearest neighbour search with the help of a kd-tree, and $n_{p_m}$ is the normal vector to point $p_m$. This non-linear minimization is solved by linearization [16].

A tree of aligned 3D scanning positions is incrementally built by means of aligning the new point clouds with the closest cloud in the tree according to the initial estimate.

Furthermore, a low resolution volumetric representation of the occupation is updated with each new aligned 3D scan. In addition to the occupation state (free, occupied or unobserved), surface normals are calculated and saved for each voxel in this representation.

4.3 Autonomous Navigation

The ICP-SLAM system described in the previous section is only updated at the points where a 3D scan is performed. Therefore, it is necessary to perform a real time localization and reactive obstacle modelling in order to control the motion of the robot when navigating to the next 3D scanning position. The uneven terrain present in underfloor voids exacerbates this task.

The main sensors involved in the real time localization and obstacle modelling are the front laser and the IMU. Typical laser navigation approaches are not suitable in rough terrains since they are designed for planar surfaces. In this regard, using the IMU, the laser readings of points corresponding to the ground can be filtered and the remaining points are projected to the horizontal plane before using laser scan matching for localization and typical occupancy grids for obstacle modelling [6]. The global position of the scan matcher is reinitialized after each new 3D scan has been aligned.

Dijkstra's Algorithm is used in order to plan the path to the next scanning position and a dynamic window approach is applied for low level planning [7].

4.4 Next Best View

The position where the next 3D scan will be performed is decided from the evaluation of multiple candidate destinations. In [2], the next utility function that considers information gain and travelling cost was proposed for performing this evaluation:

$$V(q) = G(q) e^{-\lambda C(q)} \quad (5)$$

where the utility V(q) is proportional to the information gain term G(q), and has an exponential decay with the distance to the target C(q), and $\lambda$ is a design parameter. The information gain terms is calculated counting the previously unobserved cells in a 2D occupancy grid map that could be visible from the evaluated candidate position q. While it was used for the 2D case in [2], this utility function can be easily extended to the 3D case by means of evaluating the G(q) term with a 3D ray trace counter in the previously explained low resolution volumetric representation. However, that leads to selecting target destinations that maximize information gain without considering how easy it would be to align it with the previous data. In this regard, it is proposed here to use the next utility function that introduces a localizability term:

$$V(q) = G(q) L(q) e^{-\lambda C(q)} \quad (6)$$

This localizability term L(q) is evaluated as follows:

$$L(q) = \sum_{p_v} h\left( \frac{n_{p_v} \cdot (p_v - p_q)}{\|p_v - p_q\|} \right) \quad (7)$$

where $P_v$ is the position of voxel $v \in V \subset N^3$ from the subset of visible occupied voxels in sensor range from the candidate position $p_q$, and $n_{P_v}$ are the normal unit vectors associated to the voxel v. Note that this term counts the number of visible occupied voxels weighted by the cosine of the angle between the surface normal vector and the observation direction. The function h(x) produces observations from behind that do not contribute to the count:

$$h(x) = \begin{cases} x, & x \geq 0 \\ 0, & \text{otherwise} \end{cases} \quad (8)$$

The algorithm is illustrated below:

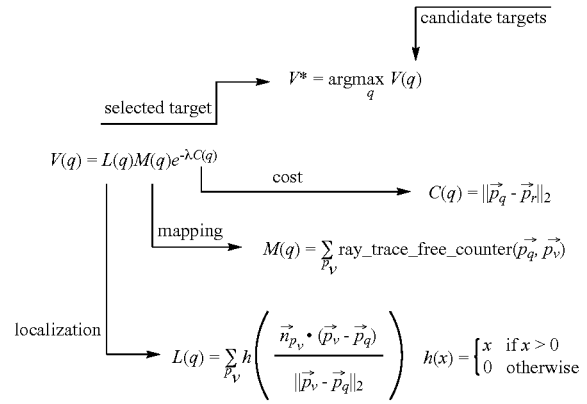

4.5 3D Model Post-Processing
4.5.1 Pose-Graph

The previous systems work online as the robot captures the data and decides where to move next. However, a better model can be created from a pose-graph including loops with multiple alignments between scans than with the simple pose-tree. Since the ICP alignment is a computationally expensive step, it is left for a post-processing stage to find all the extra alignments for building a pose-graph of the scanning positions. In this sense, additional edges are added to the initial tree for each new valid alignment found with ICP. An alignment is considered to be valid to be inserted in the graph, if the residual error (Equation 4) is low while the number of inlier points in the alignment is above a threshold.

Next, the pose-graph is optimized using stochastic gradient descent (SGD) using the tree-based network optimizer [3]. This solves the loop closure discrepancies that appear with the accumulation of error as the new data is incrementally aligned.

4.5.2 Point Cloud Fusion

The next step is to fuse the aligned point cloud data associated to each pose in the graph. A surface in the scene would have been likely observed from multiple poses, having therefore redundant data of the same area with different resolutions, noise and texture due to changes in exposure and illumination. In this sense, in order to facilitate the fusion process, a radius that depends on the distance is associated to each point (similar to the radius used in surfel representations of point clouds [9]).

The fusion process is summarized in Algorithm 1. The global point cloud is initialized with the point cloud corresponding to the first node in the pose graph. This global point cloud is incrementally updated with the other nodes. A set of correspondences is found by associating to each point in the global cloud the nearest point in the input cloud inside its radius. Next, the points in the input cloud that remain without correspondence are inserted in the global cloud. The points with correspondence are ignored if they have a larger radius than the corresponding point in the global cloud. In case they have a smaller radius, they are inserted in the global cloud and the corresponding point removed.

---
Algorithm 1 Point Cloud Fusion
---

```
GlobalCloud ← Node[0].PointCloud
for n ∈ [1,N − 1] do
    for p ∈ GlobalCloud do
        q ← Node[n].findNearestPoint(p)
        if ||p − q|| < p.radius then
            q.match ← true
            q.corr ← p
        end if
    end for
    for q ∈ Node[n] do
        if q.match then
            if q.radius < q.corr.radius then
                GlobalCloud.remove(q.corr)
                GlobalCloud.insert(q)
            end if
        else
            GlobalCloud.insert(q)
        end if
    end for
end for
```

In summary:
A radius is assigned to each point depending on the distance to the 3D scanner.
Points clouds are fused sequentially with a global cloud.
A search for points inside a circle of the point radius is performed for each point and point cloud.
If it is found a point with a smaller radius, the point is removed.
The remaining points are merged.

5. Experiments

The robot has been evaluated in a controlled test scenario and also in real world underfloor voids. The main goals of the experiments was to study the validity of the system as a 3D mapping tool for measuring depth of installed underfloor insulation and the viability of it being fully autonomous in such challenging scenarios. Next the main results of these tests are presented.

5.1. Experiments in a Test Scenario

Figure 4:
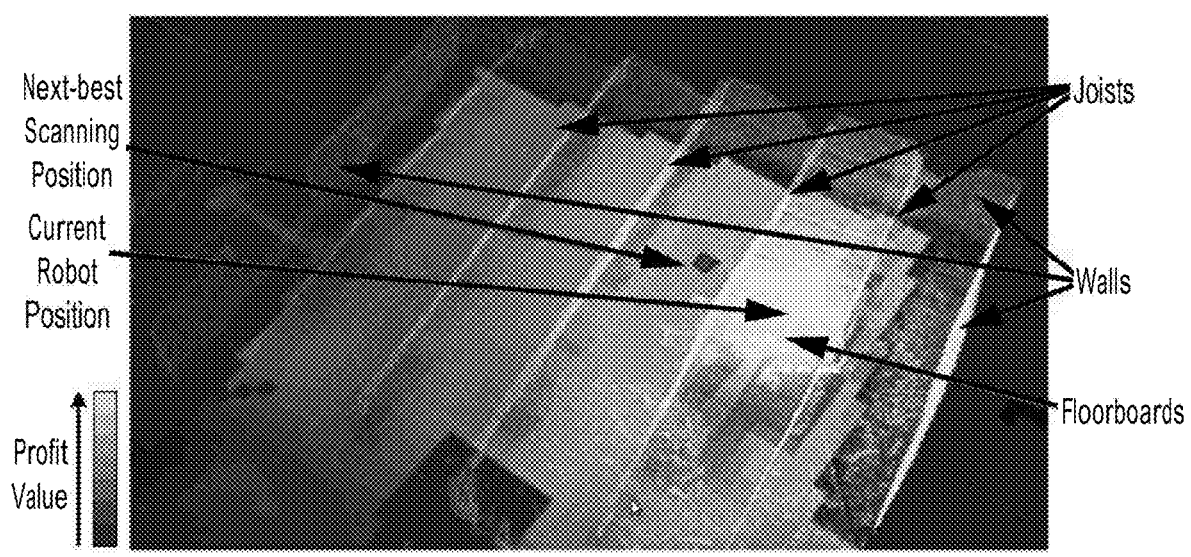
FIG. 4 illustrates an example of next-best scanning position

FIG. 4 shows an example of the functioning of the presented next-best scanning position algorithm. The lightness of the green colour represents the normalized values of the profit function of Equation 6. The previously scanned area is shown as a yellow point cloud. The red square represents the selected next best scanning position. As it can be seen, this method selects a point not too far away in order to reduce navigation time and assure a good ICP alignment of the next scan but also selects a point between the joists of the void that were occluded in the previous scan.

Using this system, the robot was successfully able to map the controlled test scenario using a total of 7 scans with an average time of 6 minutes for each scan. These 6 minutes consisted of the scanning time (4 min), the ICP-SLAM update time (45 sec), planning time (45 sec) and trajectory following time (30 sec).

5.2 Experiments in a Real Underfloor Void

The tests in real world underfloor voids presented significant problems regarding the navigation algorithms described in Section 4.3. The amount of rubble in the void could cause the scan matcher to fail. This has a significant impact in the full automation of the approach, since the selected scanning position were sometimes not reached correctly or appeared as unreachable because of the poor real-time localization. In addition, this also caused a good position guess to not be available to initialize the ICP process. This generates an incorrect global model that consequently influences the goal generation algorithm.

Figure 5:
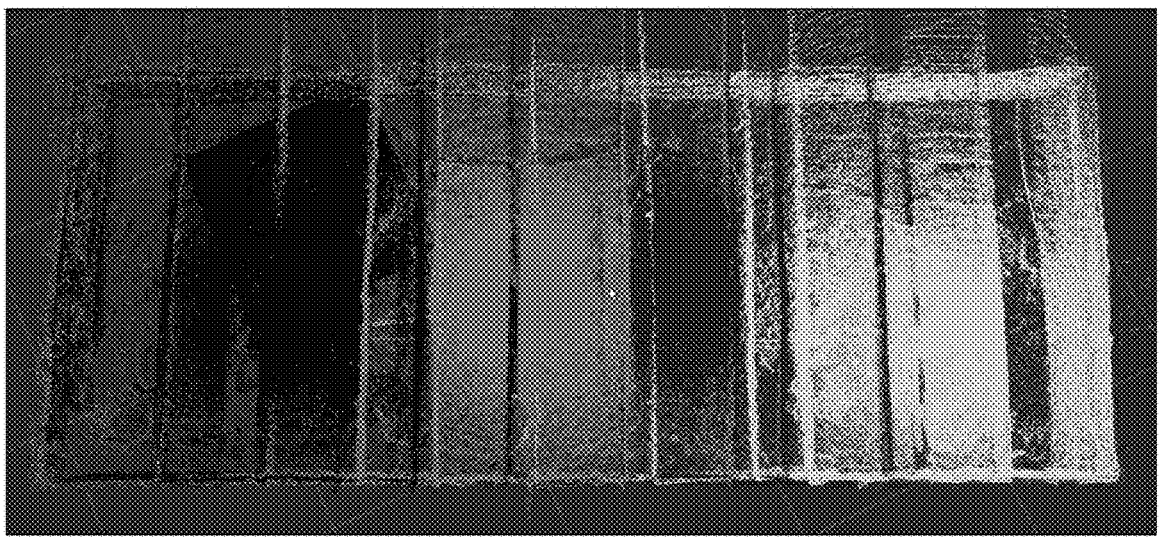
FIG. 5 illustrates the an example of ICP-SLAM
Figure 6:
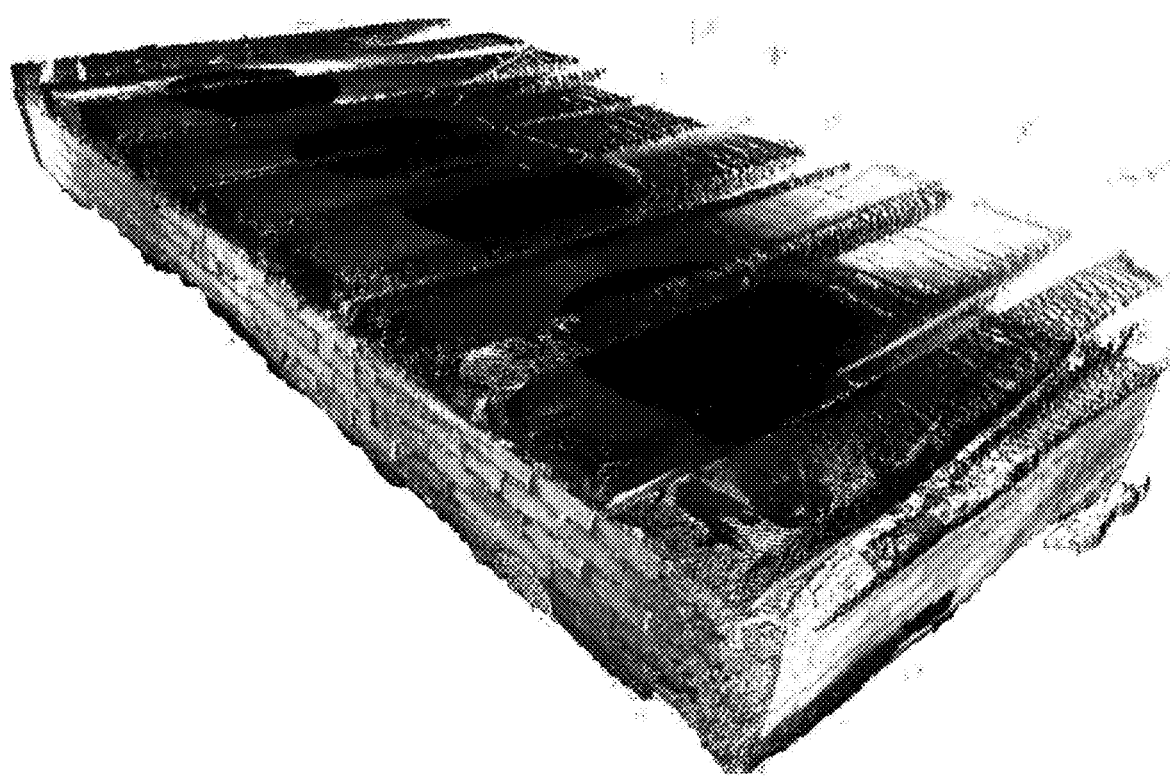
FIG. 6 illustrates an example of Point cloud fusion

In this regard, input from the operator was necessary for teleoperating the robot to the selected scanning positions and manual initialization of the ICP algorithm. FIG. 5 shows the results of the alignment of several point clouds generated from 3D scans in a real world underfloor void. The fusion process described in Section 4.5 was applied and the resulting global textured point cloud is shown in FIG. 6.

5.3 Results Measuring Insulation Depth

One of the goals of the surveying of underfloor voids with the robot was to perform coverage and depth measurements of underfloor insulation. This enables the void to be mapped before and after the installation of the insulating foam. By aligning these two models the depth measurements can be obtained.

Figure 7:
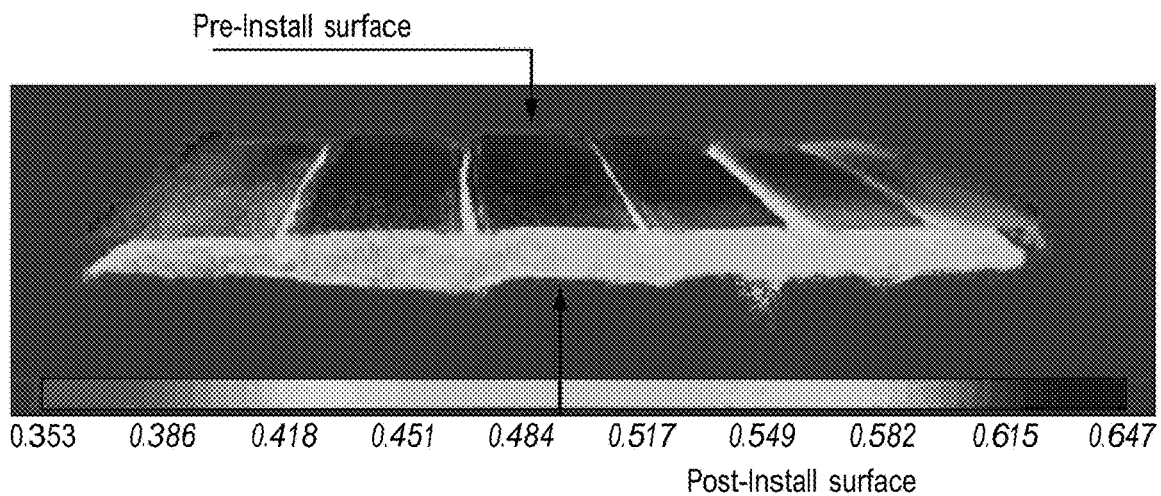
FIG. 7 illustrates an example of insulation depth measurement

FIG. 7 shows an example of insulation depth measurement. For a better visualization, the figure shows only the points corresponding to the top surface of the void where the foam is installed. The two different surfaces that appear in the figure correspond with the before model and after model. The colour code shows the difference in height, and it can be clearly observed an average of 150 mm of depth in the installed insulation.

Conclusions

A novel solution for the autonomous survey of underfloor voids has been proposed and demonstrated. The solution presented is based on a 3D scanner system with an associated calibration procedure. A real time navigation system was integrated in the robot and a new high level planner, that selects the next best scanning position, has been designed. Multiple 3D scans are aligned using ICP to provide the necessary models for the target selection and later global model generation. In this sense, a fusion algorithm was design in order to consistently combine all the data.

The tests performed show that the solution is viable for mapping the void and measuring insulation depth. However, some improvements are necessary for a robust automated survey. While tests in a controlled scenario were successful, the real-time localization was found unreliable for real world scenarios with large amounts of rubble in the floor. This leads to missing the selected scanning position and having a poor initial estimate for the ICP algorithm. When the ICP algorithm produces a bad alignment, this affects the next-best scanning position generation that affects the full approach for autonomous data acquisition.

Consequently, one of the points for further research is the design of a better real-time localization of the robot in these difficult conditions. Despite being influenced by real time localization, the initialization of the ICP algorithm can be considered a different issue. In this sense, visual features could be used in the alignment. In addition, the total time between scans would be improved by using a faster 3D scanner and parallelization of some of the algorithms involved in the ICP-SLAM and next-best scanning position algorithm.

Furthermore, while the angular resolution of commercial laser scanners is about 0.25-0.36 degrees, a high resolution camera can provide more angular resolution even using wide angle lenses. In this sense, there is more texture colour data available in the 3D scanner than depth data. While the process explained in Section 4.1 was being limited to only points with depth data, the remaining image points can still be used with interpolated depth producing a higher definition point cloud. In this way, the proposed design that provides initially about $8 \times 10^5$ points with depth data, can generate about $9 \times 10^6$ points clouds using interpolated depth. However increasing the number of points by one order of magnitude slows the system too much for online processing and therefore only can be used during the post-processing stage. In this sense, different alignments techniques could be applied using the photometric data.

In summary:
3D mapping by merging multiple scans.
ICP alignment can fail if the scans are too far away.
Exploration algorithm selects next scanning position taking alignment, mapping and distance into account.
Robust real time localization for navigation between scanning positions is required.

Exemplary Robotic Devices

As used herein, the term "robotic" refers to a device whose movements can be controlled remotely and/or by stored programming. The device may operate autonomously, semi-autonomously or entirely under operator control.

Figure 8:
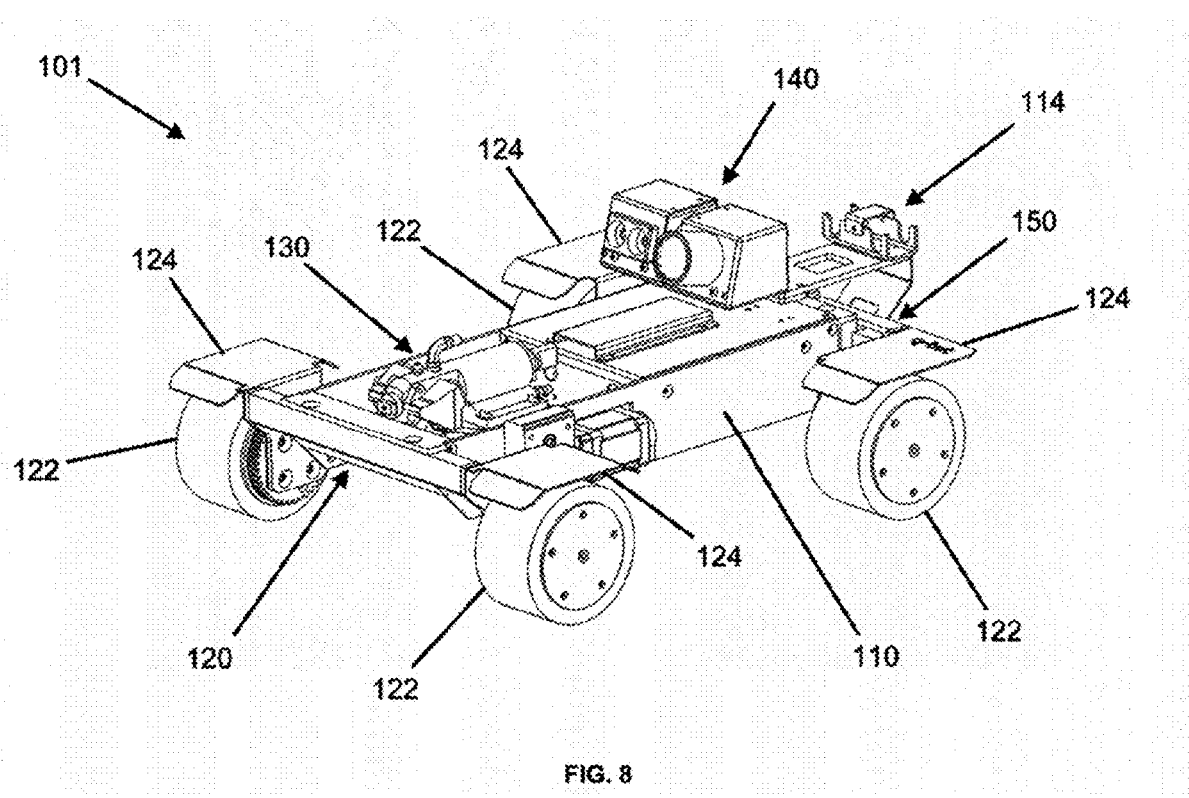
FIG. 8 is an illustration of an embodiment of a robotic vehicle according to the present disclosure.

FIG. 8 is an illustration of an embodiment of a robotic vehicle according to the present disclosure. A robotic vehicle 101 is used for moving along a lower surface of an underfloor cavity and applying an insulating layer to an underside of an upper surface of the underfloor cavity. The insulating layer is formed from polyurethane spray foam, e.g. BASF's Walltite, which is an expanding two part insulation material. However, it is also possible for the insulating layer to be formed of other sprayable materials, such as mineral wool with a chemical binder. The robotic vehicle 101 comprises a chassis 110 having a top and a bottom, and a front and a rear. The top of the chassis 110 is provided with a spray applicator in the form of a spray gun 130, and a sensor turret 140. The spray gun 130 is provided in front of the sensor turret 140. Both the spray gun 130 and the sensor turret 140 are arranged to rotate in order, respectively, to apply insulation to and acquire sensor data from a range of positions without additional translational movement of the robotic vehicle 101. The sensor turret 140 typically rotates about a single axis of rotation, substantially transverse to the lower surface on which the robotic vehicle 101 is configured to be moveable. The spray gun 130 is configured to rotate about two axes: an axis substantially transverse to the lower surface on which the robotic vehicle 101 is configured to be moveable and an axis substantially parallel to the lower surface on which the robotic vehicle 101 is configured to be moveable. In this way, the spray gun 130 and is rotatable side-to-side and up-and-down, whereby to apply insulation material to anywhere within a two dimensional region on the underside of the upper surface of the underfloor cavity without additional translational movement of the robotic vehicle 101.

The chassis 110 also comprises a propulsion system. A front wheel unit 120 is provided at the front of the chassis 110 and comprises two driven wheels 122 provided on respective sides of the front wheel unit 120. The front wheel unit 120 also comprises a wheel cover 124 over each of the driven wheels 122. A rear wheel unit 150 is provided at the rear of the chassis 110 and also comprises two driven wheels 122 provided on respective sides of the rear wheel unit 150. The rear wheel unit 150 also comprises a wheel cover 124 over each of the driven wheels 122. The driven wheels 122 provide propulsion which enables the robotic vehicle 101 to manoeuvre over the lower surface of the underfloor cavity. Each driven wheel 122 comprises a wheel and a motor unit connected to the wheel.

The chassis 110 is additionally provided with a hose mounting 114 configured to secure a length of hose (not shown) which is used to supply insulation material constituents to the spray gun 130 from a source container (not shown). The source container is typically positioned outside the underfloor cavity.

Figure 9:
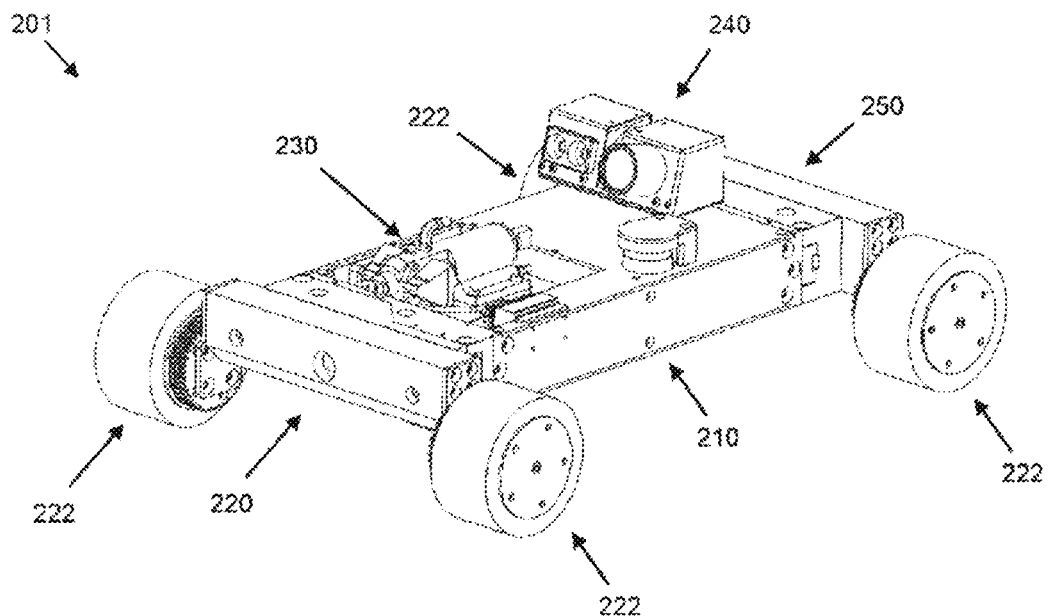
FIG. 9 is an illustration of a further embodiment of a robotic vehicle according to the present disclosure.

FIG. 9 is an illustration of a further embodiment of a robotic vehicle 201 according to the present disclosure. The features of the robotic vehicle 201 are substantially as described with reference to robotic vehicle 101 of FIG. 1 above, apart from the hereinafter described differences. Like reference numerals represent similar features. For example, robotic vehicle 201 comprises a chassis 210, being provided with a sensor turret 240 and a spray gun 230. The chassis 210 is connected to a front wheel unit 220 and a rear wheel unit 250, each being provided with two driven wheels 222.

Figure 10:
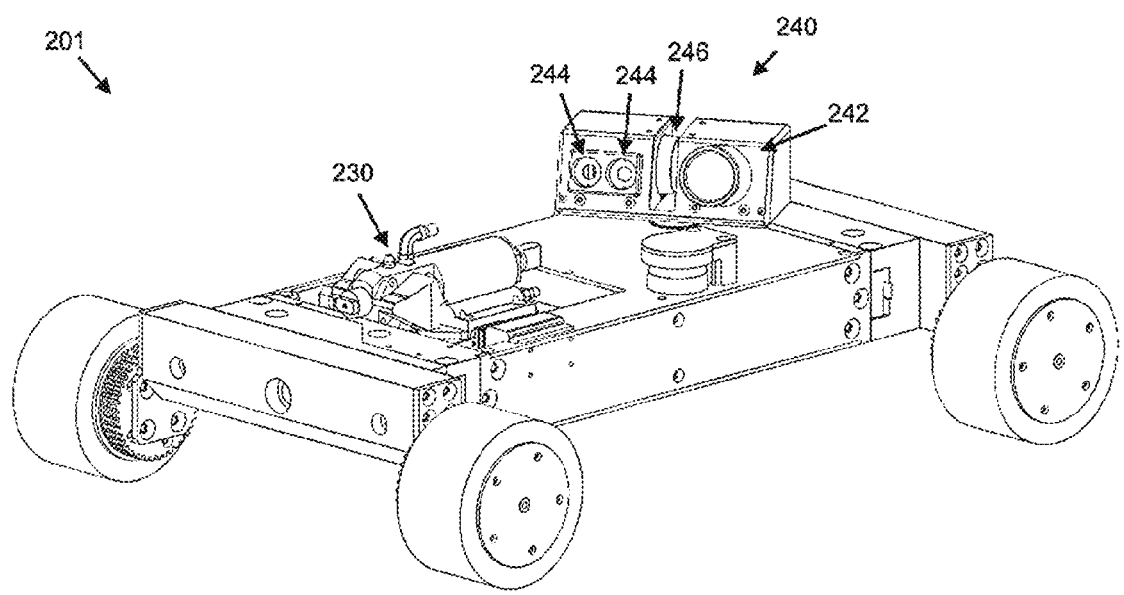
FIG. 10 is an illustration of the robotic vehicle of FIG. 9, showing the sensor turret.

FIG. 10 is an illustration of the robotic vehicle of FIG. 9, showing a sensor module in the form of a sensor turret 240. The sensor turret 240 comprises a camera 242, a pair of lights 244, and a vertical plane laser scanner 246. The sensor turret 240 is configured to be rotatable, and the camera 242, the lights 244 and the vertical plane laser scanner 246 are each arranged to point in an aligned horizontal direction. In this way, the lights 244 can be used to illuminate the scene captured by the camera 242, whilst minimising the shadows present in the image captured by the camera 242. The vertical plane laser scanner 246 is used to determine a distance to a sampling of points on the vertical plane in the direction of the horizontal rotational position of the sensor turret 240. The sensor turret 240 allows the robotic vehicle to produce a three-dimensional point cloud map, with camera images over laid to produce a texture map. The sensor turret can rotate 360° which allows the robotic vehicle 201 to generate a full hemispherical texture map of the area that has been scanned.

Figure 11:
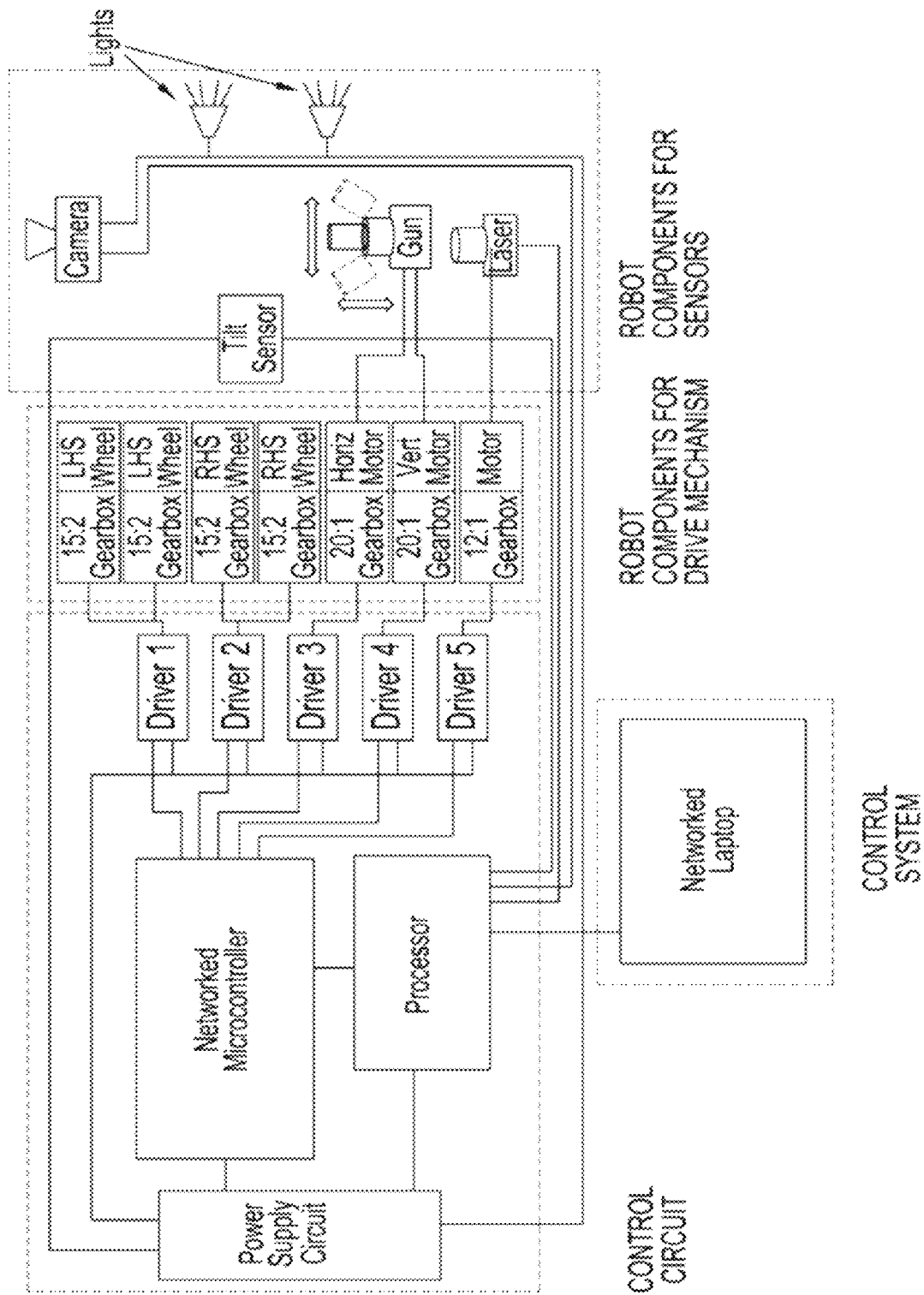
FIG. 11 is a representation of a control system for an embodiment of a robotic vehicle according to the present disclosure.

FIG. 11 is a representation of a control system for an embodiment of a robotic vehicle according to the present disclosure. The robotic vehicle components, control system software and the control circuit are connected together in an integrated way.

In operation, the robotic vehicle takes information from a tilt sensor to understand its orientation relative to a flat ground plane, and the 3D scan from the laser sensor to calculate its position relative to the surface to be treated. The system can then calculate where the spray gun is pointing relative to the image from the camera and overlay that information on a video feed. This provides the operator with more intuitive controls and understanding of where the spray gun is pointing than is possible with the limited depth perception available through a single camera. The operator can also point or otherwise select a region on a screen of an operator terminal and select the area that the robotic vehicle is to spray. The processor of the robotic vehicle then calculates the movements required to spray that area.

It will be appreciated that it would also be possible for the operator to use an alternative input device, such as a 3D headset like Oculus Rift.

As shown in FIG. 11, a DC power supply circuit provides power to a networked microcontroller, a processor, each of the drivers for the respective motors, the tilt sensor, the camera and the lights. The networked microcontroller provides low voltage control signals to each of the drivers for the respective motors. The processor is in data communication with each of the tilt sensor, the laser and the camera. A driver is provided for the left front and rear wheel motors and supplies control power signals to the wheel motors. Similarly, a driver is provided for the right front and rear wheel motors. The wheel motors drive the wheels via a 15:2 ratio gearbox, which is incorporated into the wheels. A respective driver is provided for the horizontal and vertical rotational motors of the spray gun and supplies control power signals to the respective spray gun motors. The spray gun motors drive the spray gun via a 20:1 ratio gearbox. A driver is provided for the motor of the laser and supplies control power signals to the laser motor. The laser motor drives the laser via a 12:1 ratio gearbox. The processor is connected via a computer network connection to an external networked laptop which provides control information to and from the operator.

Figure 12:
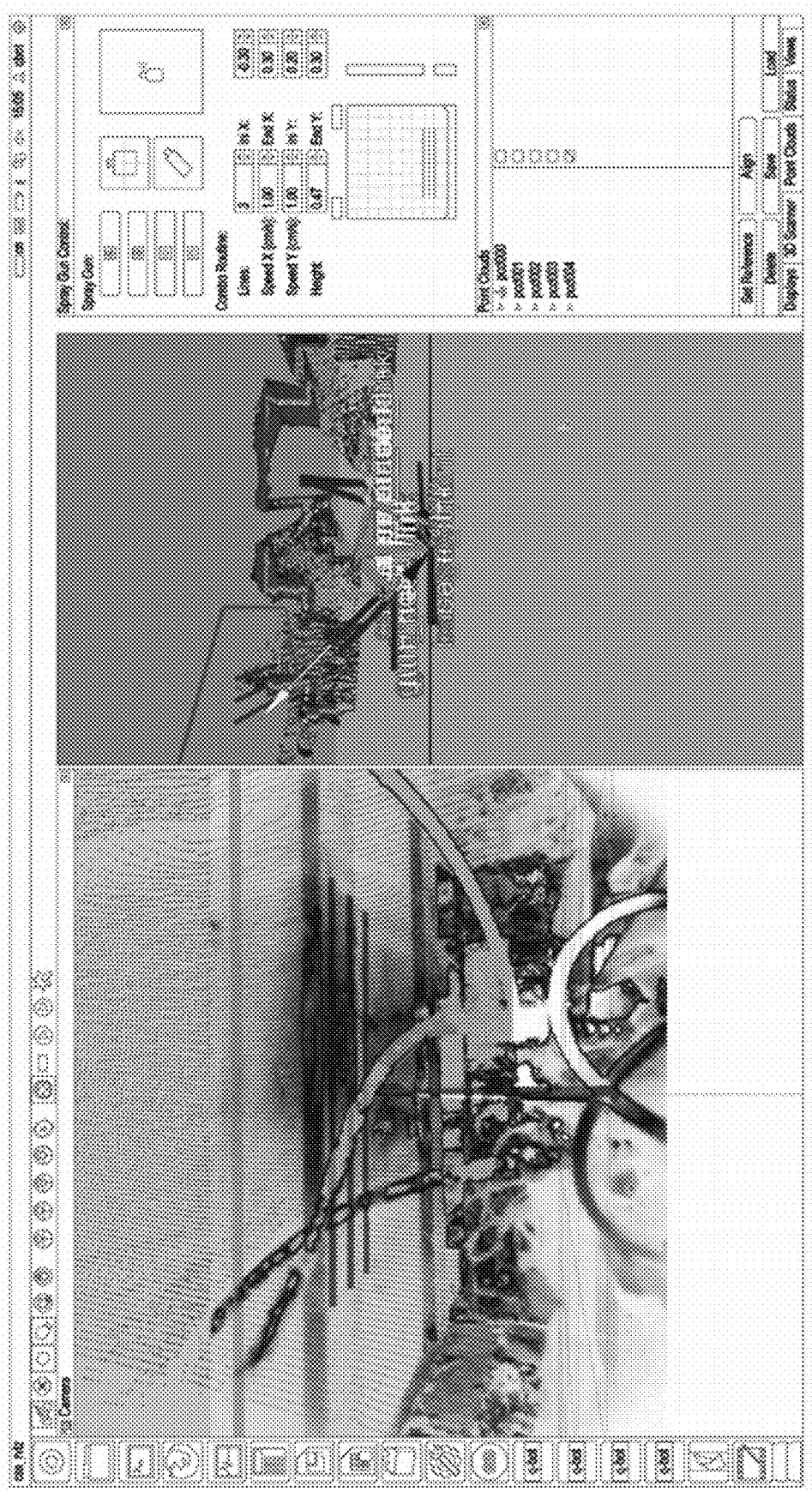
FIGS. 12 to 14 are illustrations of an embodiment of a user interface used by operators of a robotic vehicle as described in the present disclosure, showing the interface for controlling a spray gun mounted on the robotic vehicle.
Figure 13:
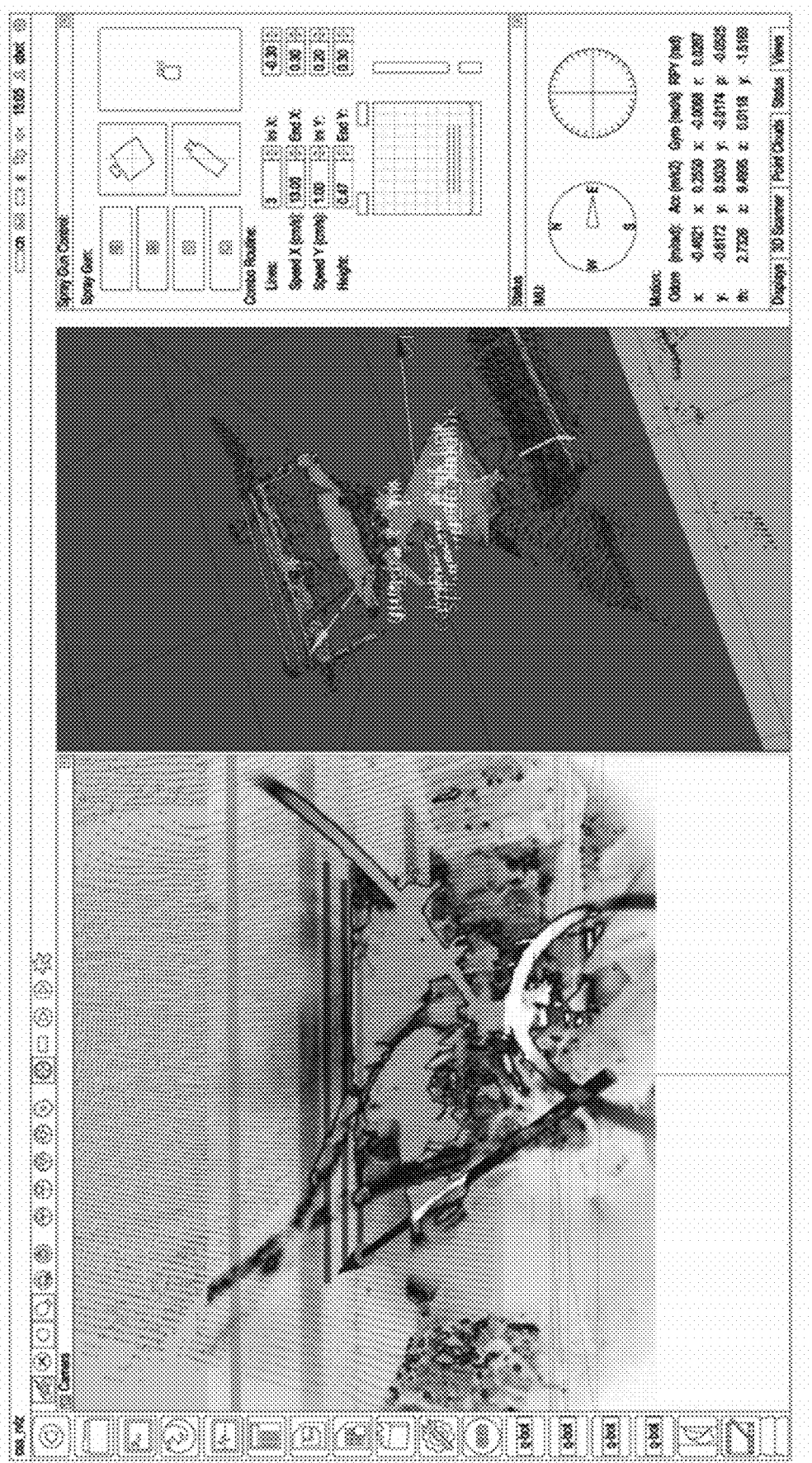
Figure 14:
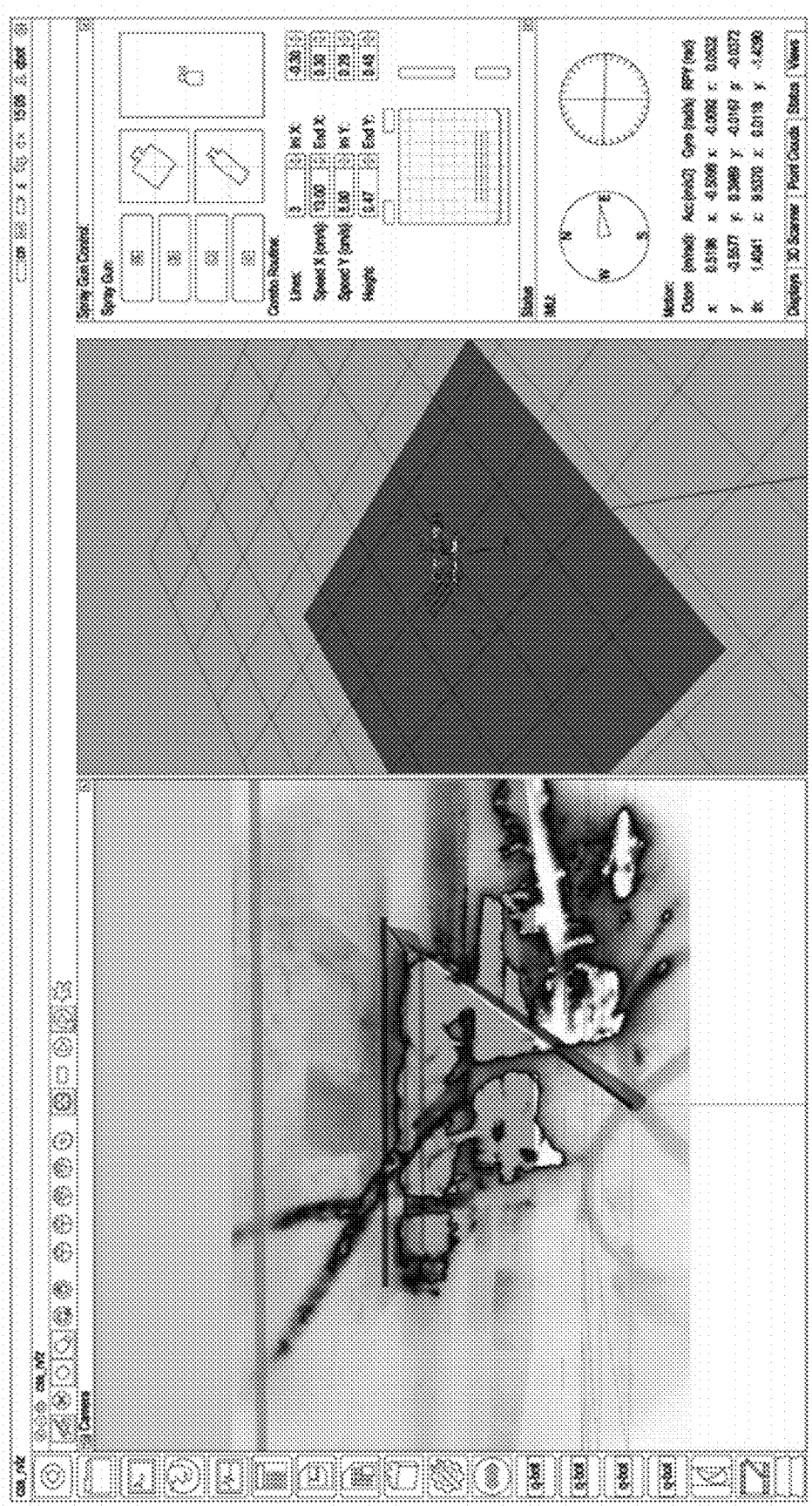

FIGS. 12 to 14 are illustrations of an embodiment of a user interface used by operators of a robotic vehicle as described in the present disclosure, showing the interface for controlling a spray gun mounted on the robotic vehicle.

FIG. 12 shows the video feed from the onboard camera with information from the map and scanning overlaid. The operator is shown where the gun is pointing by an arrow and can directly control the movement, for example with a gamepad controller. The operator can also select the area to spray and the robotic vehicle calculates the movement required to spray that area. In this case the strokes are shown as horizontal lines overlaid on the camera feed on the area to be sprayed. As shown in FIGS. 12 to 14, alongside the processed view from the camera, the user can select different views of the overall positioning of the robotic vehicle and the orientation of the spray gun within the space to be treated.

FIG. 15 is an illustration of an embodiment of a robotic vehicle 301 according to the present disclosure. The robotic vehicle 301 comprises the removable wheel units as seen in robotic vehicle 101 shown in FIG. 8. The robotic vehicle 301 also comprises a small chassis 310, a sensor turret 340, substantially as described with reference to the sensor turret 240 of FIGS. 9 and 10 and a second laser to locate the robotic vehicle 301 in the horizontal plane. The robotic vehicle 301 also includes batteries (not shown) so it can operate wirelessly without requiring power via an umbilical connection. The robotic vehicle 301 is configured to operate as a surveying robotic vehicle to gather information and sensor data regarding a cavity before a treatment robotic vehicle will be sent into the cavity.

FIG. 16 is an illustration of an embodiment of a robotic device 401 according to the present disclosure. The robotic device 401 is in the form of a motorised arm formed of a plurality of interengagable modular units 402. At one end, the robotic device 401 comprises a modular unit 403 formed of a chassis 405 and a sensor turret 404, substantially as described with reference to the sensor turret 240 of FIGS. 9 and 10. The robotic device 401 is configured to operate as a surveying robotic device to gather information and sensor data regarding a cavity before a treatment robotic device will be sent into the cavity.

The camera may be visual or thermal. The range finding system may be ultrasonic, a laser scanner (e.g. Hokuyo urg-04lx) or infrared (e.g. Creative Senz3D). The sensor platform may rotate or pan to gain a full 3-D image. The spray gun is mounted on a motorised one or two axis gun platform allowing the operator to remotely control the application of the material. This may be done directly with a gamepad controller or by the device calculating the required spray pattern to cover the given area.

The control system for application of materials takes information from the range finder, and a nine-degree of freedom motion/tilt sensor to calculate the position of the robotic vehicle relative to the surface being sprayed. This information can then be used to draw on the video feed where the gun is pointing aiding manual spraying by the operator. Or the operator can select an area on the map or video feed and the robotic vehicle automatically calculates the area that needs to be sprayed.

The robotic vehicle may also or instead be used in building inspection and maintenance applications. This includes: surveying; mapping and investigating hazardous 'crawl spaces' e.g. asbestos surveying or checking wiring; surveying services for example mapping pipe work and checking for leaks; and structural surveys.

For some of these applications, it will be appreciated that the robotic vehicle need not be equipped with the spray gun tool.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

[1] K. S. Arun, T. S. Huang, S. D. Blostein: Least-squares fitting of two 3-D point sets, IEEE Trans. Pattern Analysis and Machine Intelligence 9 (5) (1987) 698-700.
[2] H. H. González-Baños., J. C. Latombe: Navigation strategies for exploring indoor environments. The International Journal of Robotics Research 21.10-11 (2002): 829-848.
[3] G. Grisetti, C. Stachniss, and W. Burgard: Non-linear Constraint Network Optimization for Efficient Map Learning. IEEE Transactions on Intelligent Transportation Systems, Volume 10, Issue 3, Pages 428-439, 2009
[4] D. Holz, A. Ichim, F. Tombari, R. Rusu, S. Behnke: Registration with the Point Cloud Library: A Modular Framework for Aligning in 3-D, in Robotics and Automation Magazine, IEEE, vol. 22, no. 4, pp. 110-124, Dec. 2015
[5] M. Juliá, A. Gil, and O. Reinoso: A comparison of path planning strategies for autonomous exploration and mapping of unknown environments. Autonomous Robots 33.4 (2012): 427-444
[6] S. Kohlbrecher, O. von Stryk, J. Meyer, U. Klingauf: A flexible and scalable SLAM system with full 3D motion estimation, 2011 IEEE International Symposium on Safety, Security, and Rescue Robotics (SSRR), vol., no., pp. 155-160, 1-5 Nov. 2011
[7] E. Marder-Eppstein, E. Berger, T. Foote, B. Gerkey, K. Konolige: The Office Marathon: Robust navigation in an indoor office environment, IEEE Int. Conf. on Robotics and Automation (ICRA), 2010
[8] A. A. Makarenko, S, B. Williams, F. Bourgault, H. F. Durrant-Whyte: An experiment in integrated exploration, IEEE/RSJ Int Conf. on Intelligent Robots and Systems, 534-539 vol. 1, 2002
[9] T. Whelan, S. Leutenegger, R. F. Salas-Moreno, B. Glocker and A. J. Davison: ElasticFusion: Dense SLAM Without A Pose Graph, Proceedings of Robotics: Science and Systems, 2015
[10] M. Quigley, B. Gerkey, K. Conley, J. Faust, T. Foote, J. Leibs, E. Berger, R. Wheeler, and A. Y. Ng: ROS: an open-source Robot Operating System, in Proc. Open-Source Software workshop of the International Conference on Robotics and Automation (ICRA), 2009
[11] Simmons, R., Apfelbaum, D., Burgard, W., Fox, D., Moors, M., Thrun, S., and Younes, H. (2000). Coordination for multi-robot exploration and mapping. In Proceedings of the AAAI national conference on artificial intelligence, Austin, Tex., USA.
[12] Yamauchi, B. (1997). A frontier based approach for autonomous exploration. In Proceedings of the IEEE international symposium on computational intelligence in robotics and automation (CIRA '97), Monterey, Calif., USA.
[13] Stachniss, C., Grisetti, G., and Burgard, W. (2005a). Information gain-based exploration using Rao-Blackwellized particle filters. In Proceedings of robotics: science and systems (RSS '05), Cambridge, Mass., USA.
[14] Zlot, R., Stentz, A., Dias, M. B., and Thayer, S. (2002). Multi-robot exploration controlled by a market economy. In Proceedings of the IEEE international conference on robotics and automation (ICRA '02), Washington, D.C., USA.
[15] Wurm, K. M., Stachniss, C., and Burgard, W. (2008). Coordinated multi-robot exploration using a segmentation of the environment. In Proceedings of the IEEE-RSJ international conference on intelligent robots and systems (IROS '08), Nice, France.
[16] K.-L. Low, "Linear least-squares optimization for point-to-plane ICP surface registration," in Technical Report TR04-004, Department of Computer Science, University of North Carolina at Chapel Hill, 2004.
[17] A. W. Fitzgibbon, "Robust registration of 2D and 3D point sets," in British Machine Vision Conference (BMVC), 2001, pp. 411-420.
[18] Henrik Andreasson and Achim J. Lilienthal 6D Scan Registration using Depth-Interpolated Local Image Features
[19] Newcombe et al. KinectFusion: Real-Time Dense Surface Mapping and Tracking
[20] P. J. Besl and N. D. McKay, "A method for registration of 3-D shapes," IEEE Transactions on Pattern Analysis and Machine Intelligence (PAMI), vol. 14, no. 2, pp. 239-256, 1992.
[21] H. Alismail and B. Browning, "Automatic calibration of spinning actuated lidar internal parameters," Journal of Field Robotics, 201

The invention claimed is:

1. A method of processing depth data and image data from a robotic device having a camera and a depth measurement device mounted to a chassis of the robotic device to generate a data set representative of a three-dimensional map of an environment in which the robotic device is located, wherein the camera is adapted to generate image data relating to the environment, and the depth measurement device is adapted to generate depth data relating to the environment, the method comprising:
   generating first image data and first depth data at a first location of the robotic device in the environment to generate a first data set of first data set data points,
   moving the robotic device to at least a second location in the environment,
   generating second image data and second depth data at the second location to generate a second data set of second data set data points,
   associating each of the first data set data points with the second data set points that are within a predefined distance from the respective first data set data points, and
   replacing each of the first data set data points with the associated second set data points based on a distance of the first and second data set data points from the robotic device when the respective data points were generated.

2. A method as claimed in claim 1 further comprising:
adding to the first data set data points each of the second data set data points that are not associated with any of the first set data set points.

3. A method as claimed in claim 1, wherein the first set data points are replaced with the associated data points from the second data set data points when the second data set data points are closer to the robotic device than the first set data points when the respective data points were generated.

4. A method as claimed in claim 1, wherein the robotic device is adapted to move autonomously from the first location to the second location.

5. A method as claimed in claim 4, wherein the second location is calculated by selecting a candidate second location from a number of candidate locations based on an expected increase in information relating to the environment achievable at each candidate location.

6. A method as claimed in claim 5, wherein the second location is calculated based on the expected increase in information in combination with a distance to each candidate location.

7. A method as claimed in claim 4, wherein the second location is calculated by selecting a candidate second location from a number of candidate locations based on a distance of each candidate location from the first location.

8. A method as claimed in claim 1, wherein the depth measurement device is adapted to generate depth data relating to a forward direction and to a rearward direction of the robotic device.

9. A method as claimed in claim 8, wherein the depth measurement device is adapted to rotate about an axis substantially perpendicular to the forward direction and the rearward direction.

10. A method as claimed in claim 1, wherein the depth measurement device is a laser rangefinder.

11. A robotic device having a camera and a laser rangefinder mounted to a chassis of the robotic device and a data processing apparatus configured to control the robotic device to carry out the method of claim 1.

12. A method of processing depth data and image data from a robotic device having a camera and a depth measurement device mounted to a chassis of the robotic device to generate a data set representative of a three-dimensional map of an environment in which the robotic device is located, wherein the camera is adapted to generate image data relating to the environment, and the depth measurement device is adapted to generate depth data relating to the environment, the method comprising:
receiving a first data set of first data set data points having image data and depth data from a first location of the robotic device in the environment,
receiving a second data set of second data set data points having image data and depth data at a second location of the robotic device in the environment,
associating each of the first data set data points with the second data set data points that are within a predefined distance from the first data point, and
replacing each of the first data set data points with the associated data points from the second data set data points based on a distance of the first and second data set data points from robotic device when the respective data points were generated.

13. A method as claimed in claim 12 further comprising:
adding to the first data set data points each of the second data set data points that are not associated with any of the first data set data points.

14. A method as claimed in claim 12, wherein the first data set data points are replaced with the associated data points from the second data set data points when the second data set data points are closer to the robotic device than the first set data points when the respective data points were generated.

15. A non-transitory computer-readable storage medium comprising computer-readable instructions, which, when executed by a general purpose data processing apparatus, causes the general purpose data processing apparatus to carry out the method of claim 12.

* * * * *